United States Patent
Zarakas et al.

(10) Patent No.: US 9,949,065 B1
(45) Date of Patent: Apr. 17, 2018

(54) SYSTEM AND METHOD FOR AUTOMATIC BLUETOOTH PAIRING

(71) Applicant: Capital One Services, LLC, McLean, VA (US)

(72) Inventors: James Zarakas, Centerville, VA (US); Kevin Kelly, Austin, TX (US); Saleem Sangi, Ellicott City, MD (US); Adam Koeppel, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/698,724

(22) Filed: Sep. 8, 2017

Related U.S. Application Data

(60) Provisional application No. 62/440,525, filed on Dec. 30, 2016.

(51) Int. Cl.
| | |
|---|---|
| *H04W 4/20* | (2009.01) |
| *H04W 4/00* | (2018.01) |
| *H04L 29/06* | (2006.01) |
| *G06Q 20/34* | (2012.01) |
| *G06Q 20/38* | (2012.01) |
| *H04W 12/06* | (2009.01) |
| *H04W 12/04* | (2009.01) |

(52) U.S. Cl.
CPC .......... *H04W 4/008* (2013.01); *G06Q 20/341* (2013.01); *H04L 63/083* (2013.01); *G06Q 20/3829* (2013.01); *G06Q 2220/00* (2013.01); *H04W 4/206* (2013.01); *H04W 12/04* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2011/0117845 A1* | 5/2011 | Kirsch | H04M 1/6091 455/41.2 |
| 2012/0083209 A1* | 4/2012 | Giles | H04W 4/206 455/41.2 |
| 2014/0235166 A1* | 8/2014 | Molettiere | H04B 7/26 455/41.2 |
| 2015/0207626 A1* | 7/2015 | Neftel | G08C 17/02 713/168 |
| 2015/0289124 A1* | 10/2015 | Palin | H04W 8/005 455/41.2 |
| 2015/0350820 A1* | 12/2015 | Son | H04W 4/008 455/41.2 |
| 2016/0050553 A1* | 2/2016 | Kang | G06Q 30/0601 455/41.2 |

* cited by examiner

*Primary Examiner* — David Bilodeau
(74) *Attorney, Agent, or Firm* — Hunton & Williams LLP

(57) ABSTRACT

A method and system for automatically connecting one customer device with another over a Bluetooth or similar connection. The automatic connection may be made by generating a unique identifier to store on a new customer device and a backend system associated with an existing customer device and connecting the new customer device with the existing customer device using the unique identifier.

8 Claims, 6 Drawing Sheets

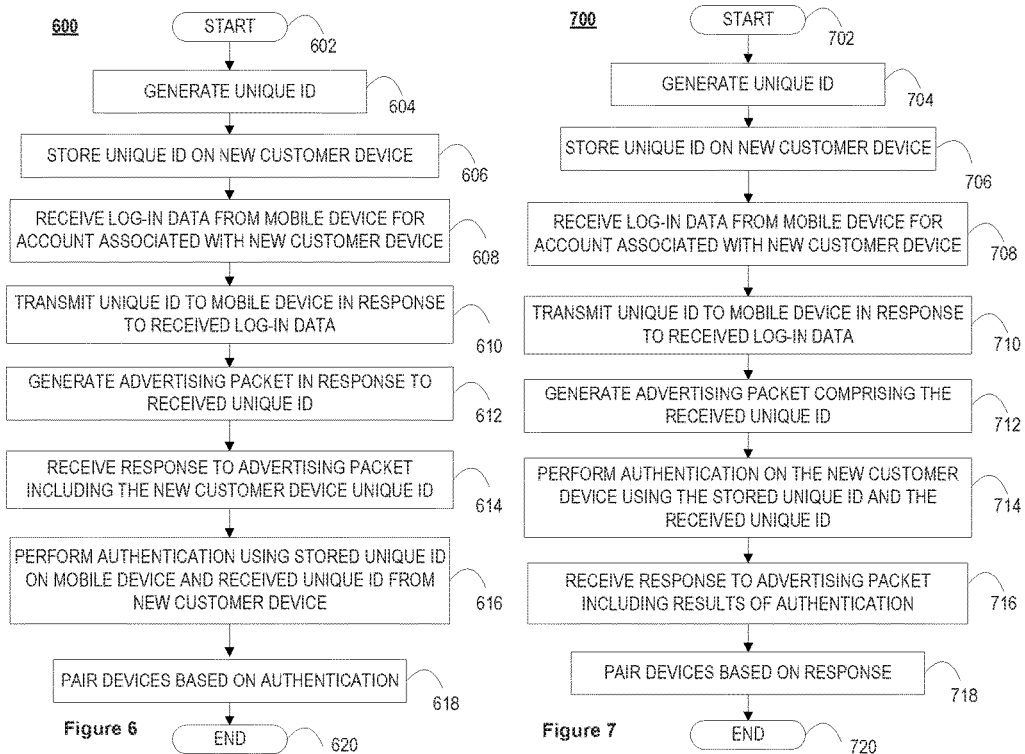

SYSTEM AND METHOD FOR AUTOMATIC BLUETOOTH PAIRING

CROSS REFERENCE TO RELATED APPLICATION

The subject application claims the benefit of U.S. Provisional Patent Application No. 62/440,525, filed on Dec. 30, 2016, the contents of which is hereby incorporated by reference in their entireties.

FIELD OF THE DISCLOSURE

The present disclosure relates to automatically connecting one customer device with another over a Bluetooth or similar connection. Specifically, the present disclosure relates to generating a unique identifier to store on a new customer device and a backend system associated with an existing customer device and connecting the new customer device with the existing customer device using the unique identifier.

BACKGROUND OF THE DISCLOSURE

Currently, in order to connect two devices using Bluetooth, the devices must be paired by a user manually confirming the identity of the device(s) being paired. Specifically, the device to use must be put in discovery mode by pressing a button or opening a Bluetooth setting scene. Then, a user must enter a settings screen to select the discoverable device on the connecting device. For security reasons, the user may also be required to input a PIN in order to pair the devices via Bluetooth, precluding other devices from being paired without the user's authorization. Accordingly, pairing two devices over Bluetooth requires a number of user inputs, several of which are subject to user error, with its attendant drawbacks on consumer satisfaction, network efficiency, and security.

These and other drawbacks exist.

SUMMARY OF THE DISCLOSURE

Various embodiments of the present disclosure provide a system and method for automatically and securely connecting two devices over a Bluetooth connection without a user confirming the identity of the device(s) as described above. As described herein, one device may be described as a new customer device. A new customer device may be any device capable of connecting with another device using Bluetooth. A new customer device may be a user device newly received by a customer or a user device to newly pair with an existing customer device. As described herein, a second device may be an existing customer device. An existing customer device may be any device capable of connecting with another device using Bluetooth. An existing customer device may be a device already in possession of a user.

In an example embodiment, a new customer device may be paired with an existing customer device using a unique identifier (ID). A unique ID may be generated using existing data, such as a mobile device number, a customer name, a customer address, a customer account number, a device identifier, and the like. A unique ID may be generated using a random number generator. A unique ID may be a hashed version of any single piece or combination of existing data.

In an example embodiment, a unique ID may be pre-stored on the new customer device by the device provider. The same unique ID also may be stored on a backend system hosted by the device provider. In this manner, when a customer receives the new customer device, the new customer device already has a unique ID stored within the device. A unique ID may be used as a link key for pairing two devices over Bluetooth. A unique ID may be used to generate a link key for pairing two devices over Bluetooth.

In an example embodiment, when a customer receives the new customer device, an existing customer device may detect the new customer device and open an application stored on the existing customer device upon the detection. The application stored on the existing customer device may transmit a request to the device provider system over a secure connection. A request may include a request for a unique ID associated with the existing customer device application (e.g., an account associated with the existing customer device) and/or a device identifier associated with the new device. In response to the request, the device provider system may transmit the unique ID to the existing device over the secure connection. In response to the request, the device provider system may transmit a new device ID to the existing device over a secure connection. The new device ID may include a time-based one time password.

In an example embodiment, upon receiving a unique ID, an existing customer device may transmit a first data packet to the new customer device. An existing customer device also may control wireless communications based on the new device ID such that the existing device may only accept interaction requests (e.g., a request to pair) from a device associated with the new device identifier. The first data packet may include a request for devices capable of pairing with the existing device. The first data packet may include a request for a unique ID from the new customer device. The first data packet may include the unique ID received at the existing device from the device provider system.

In an example embodiment, the new customer device may respond to first data packet. If the first data packet includes the unique ID from the existing customer device, the new customer device may generate a link key using the unique ID. In this manner the new customer device may cryptographically authenticate the identity of the existing customer device. For example, the new customer device may decrypt the received unique ID using a secret key stored on the new customer device. The new customer device may then compare the received unique ID with the unique ID stored within the new customer device and, if the unique IDs match, the new customer device may generate a link key to create a connection between the new customer device and the existing customer device. If the unique IDs do not match, a connection may not be made.

A link key may then be used to generate an Asynchronous Connection-Less (ACL) link, which may be encrypted to provide a secure connection between the new customer device and the existing customer device. The link key may be stored as a private key on the new customer device. The link key may be stored as a public key on a backend system.

In an example embodiment, if a first data packet includes a request for the new customer device to respond with its unique ID, the new customer device may encrypt the unique ID stored within the new customer device and transmit the encrypted unique ID to the existing customer device in response to the first data packet. Upon receiving the response to the first data packet, the existing customer device may decrypt the received unique ID using a secret key stored within the existing customer device, and compare the decrypted received unique ID with the unique ID received from the device provider system. If the unique IDs match, the existing customer device may generate a link key to create a connection between the existing customer device and the new customer device. If the unique IDs do not match, a connection may not be made.

A link key may then be used to generate an Asynchronous Connection-Less (ACL) link, which may be encrypted to provide a secure connection between the new customer device and the existing customer device.

Where a first data packet includes a request for responses from devices capable of pairing with the existing device, the request may include a request to respond with a device ID. A new device may respond with a new device ID and, if the new device ID matches the new device ID received at the existing device from the device provider system, the existing device may proceed with a second data packet to initiate the pairing of the existing device to the new device using a unique ID as described herein.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 6 depicts an example method for automatically creating a Bluetooth connection between a new customer device and an existing customer device according to embodiments of the disclosure; and FIG. 7 depicts an example method for automatically creating a Bluetooth connection between a new customer device and an existing customer device according to embodiments of the disclosure.

DETAILED DESCRIPTION OF THE EMBODIMENTS

The following description is intended to convey a thorough understanding of the embodiments described by providing a number of specific exemplary embodiments and details involving automatically creating a Bluetooth connection between a new customer device and an existing customer device. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs.

A financial institution and system supporting a financial institution are used as examples for the disclosure. The disclosure is not intended to be limited to financial institutions only. For example, many other device and account providers may exist, such as electronics companies (e.g., smartphone companies, wearable companies, headset companies, television and monitor companies, and the like).

Additionally, an electronic transaction card is used as an example of a new customer device. The disclosure is not intended to be limited to electronic transaction cards only. For example, many other devices may exist, such as any device capable of communicating using a Bluetooth connection. An electronic transaction card may include any type of transaction card that includes a microcontroller-enabled card used in any type of transaction, including, for example, debit cards, credit cards, pre-paid cards, cards used in transportation systems, membership programs, loyalty programs, hotel systems, and the like. An electronic transaction card may include enhanced features, including hardware, software, and firmware, beyond the traditional features of a magnetic stripe or EMV card. An electronic transaction card may include a Trusted Platform Module (TPM), and may store encryption keys for hardware authentication.

Additionally, a mobile device is used as an example of an existing customer device. The disclosure is not intended to be limited to mobile devices only. For example, many other devices may exist, such as any device capable of communicating using a Bluetooth connection. The use of "mobile device" in the examples throughout this application is only by way of example. Any type of device capable of communicating with a new customer device may also be used, including, for example, personal computers, tablets, gaming systems, televisions, cars, appliances (e.g., refrigerators), lighting systems, or any other device capable of communicating with a new customer device.

Figure 1:
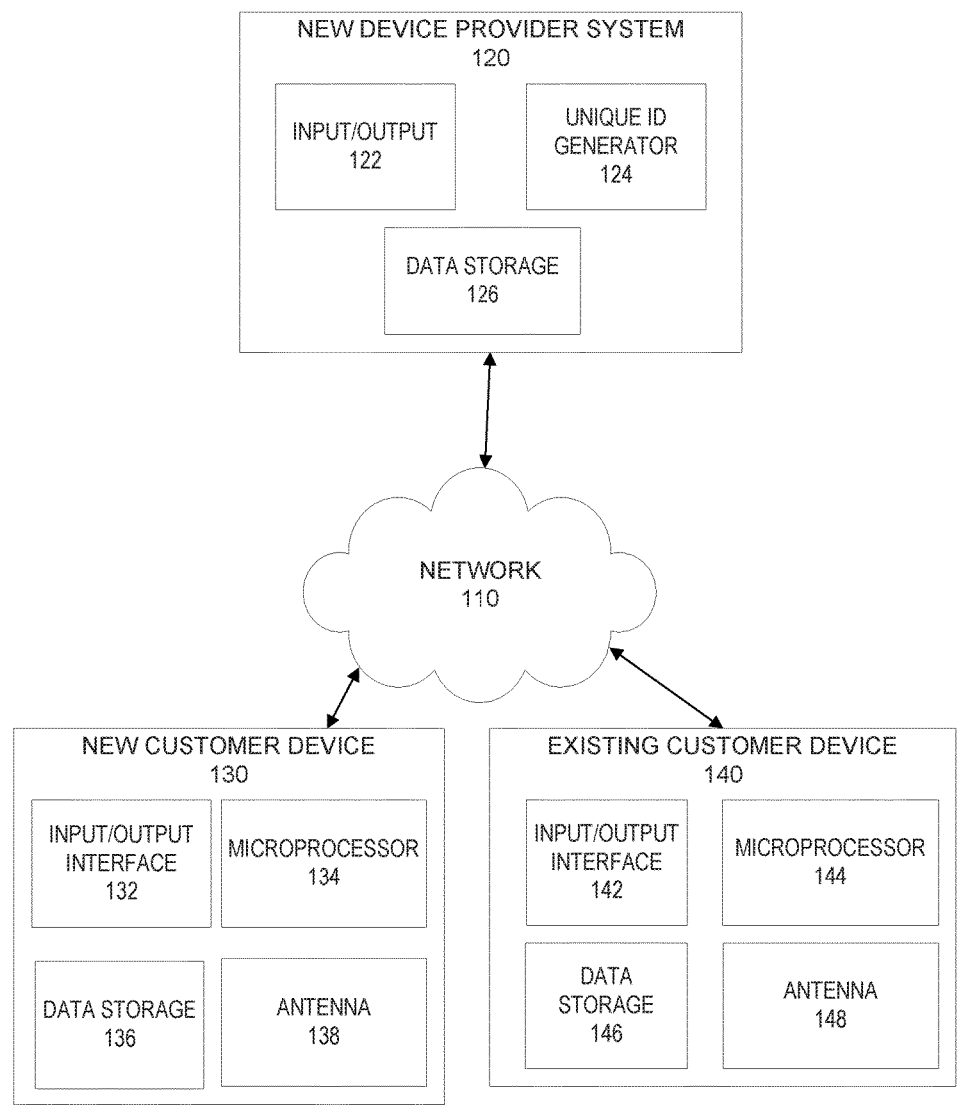
FIG. 1 depicts an example embodiment of a system for automatically creating a Bluetooth connection according to embodiments of the disclosure.

As shown in FIG. 1, an example system 100 may include one or more new device provider systems 120, one or more new customer devices 130, and one or more existing customer devices 140 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

New customer device 130 and/or existing customer device 140 may include, for example, one or more mobile devices, such as, for example, an electronic smartcard (e.g., electronic transaction card), personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

New customer device 130 and/or existing customer device 140 may be any device capable communicating via, for example, Bluetooth technology, NFC technology, WiFi Direct technology, and/or the like and execute various functions to transmit and receive data. For example, new customer device 130 and/or existing customer device 140 could be an iPhone, iPod, iPad from Apple® or any other mobile device running Apple's iOS operating system, any device running Google's Android® operating system, including, for example, smartphones running the Android® operating system and/or other wearable mobile devices, such as Google Glass or Samsung Galaxy Gear Smartwatch, any device running Microsoft's Windows® Mobile operating system, and/or any other smartphone or like device.

New customer device 130 and/or existing customer device 140 also may be a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

New customer device 130 and/or existing customer device 140 may include at least one central processing unit (CPU), which may be configured to execute computer program instructions to perform various processes and methods. New customer device 130 and/or existing customer device 140 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

New customer device 130 and/or existing customer device 140 may further include, for example, a processor, which may be several processors, a single processor, or a single device having multiple processors. Although depicted as single elements, it should be appreciated that according to one or more embodiments, new customer device 130 and/or existing customer device 140 may comprise a plurality of new customer devices 130 and/or existing customer devices 140.

New customer device 130 and/or existing customer device 140 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

As shown in FIG. 1, new customer device provider system 120, new customer device 130 and/or existing customer device 140 may include a number of components. As used herein, the term "component" may be understood to refer to computer executable software, firmware, hardware, and/or various combinations thereof. It is noted there where a component is a software and/or firmware module, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component.

As depicted in FIG. 1, system 100 may include new device provider system 120. New device provider system 120 may include, for example, a system associated with manufacturing and/or providing a new customer device, such as new customer device 130, to a customer. New device provider system 120 may include an input/output component 122, a unique ID generator 124, and/or data storage 126.

Input/output component 122 may include for example, I/O devices, which may be configured to provide input and/or output to new device provider system 120 (e.g., keyboard, mouse, display, speakers, printers, modems, network cards, etc.). Input/output component 122 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of new device provider system 120 and a bus that allows communication among the various components of new device provider system 120. Input/output component 122 may include a display, which may include for example output devices, such as a printer, display screen (e.g., monitor, television, and the like), speakers, projector, and the like.

Unique ID generator 124 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Unique ID generator may generate a unique ID using any of these components. A unique ID may be generated by hashing customer data, new device data, and/or existing device data. For example, a unique ID may be generated using a customer address, customer name, customer identifier, existing device number, new device number, existing device account number, new device account number, and/or the like.

Data storage 126 may include for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Data storage 126 may store new customer device data such as a new customer device identifier, a unique ID associated with a new customer device, an account number, phone number, address number, and/or the like associated with the new customer device, and the like. Data storage 126 may store existing customer device data such as existing customer device identifiers, a unique ID associated with an existing customer device, an account number, phone number, address number, and/or the like associated with the existing customer device, and the like As depicted in FIG. 1, system 100 may include new customer device 130. New customer device 130 may include, for example, a new customer device to be paired via Bluetooth to an existing customer device, such as existing customer device 140. Customer device 130 may include an input/output component 132, a microprocessor 134, data storage 136, and an antenna 138. Existing customer device 140 may include an input/output component 142, a microprocessor 144, data storage 146, and an antenna 148

Input/output components 132, 142 may include for example, I/O devices, which may be configured to provide input and/or output to new customer device 120 and existing customer device 140, respectively (e.g., keyboard, mouse, display, speakers, printers, modems, network cards, etc.). Input/output components 132, 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of new customer device 130 and/or existing customer device 140 and a bus that allows communication among the various components of new customer device 130 and/or existing customer device 140. Input/output components 132, 142 may include a display, which may include for example output devices, such as a printer, display screen (e.g., monitor, television, and the like), speakers, projector, and the like.

Input/output components 132, 142 may include a Bluetooth module or chipset with a Bluetooth transceiver and a chip that may interact with antenna 138, 148. The transceiver may transmit and receive information via the antenna and an interface. The chip may include a microprocessor that stores and processes information specific to a piconet and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the new customer device 130 and/or existing customer device 140 (e.g., The Android platform, the iOS platform). Using a Bluetooth API, an application stored on new customer device 130 and/or existing customer device 140 (e.g., a banking application, a financial account application, etc.) or the device may be able to scan for other Bluetooth devices (e.g., new customer device 130), query the local Bluetooth adapter for paired Bluetooth devices, establish RFCOMM channels, connect to other devices through service discovery, transfer data to and from other devices, and manage multiple connections. A Bluetooth API used in the methods, systems, and devices described herein may include an API for Bluetooth Low Energy (BLE) to provide significantly lower power consumption and allow devices to communicate with BLE devices that have low power requirements.

Microprocessors 134, 144 may include one or more processing components of new customer device 130 and existing customer device 140, respectively. Microprocessors 134, 144 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Microprocessors 134, 144 may be capable of encrypting and decrypting unique IDs, link keys, shared secret keys, and the like.

Data storage components 136, 146 may include for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Data storage 136 may store a unique ID that was placed into data storage 136 by the new device provider system 120. Data storage 136 may store a generated link key or shared secret key. Data storage 136 may store new customer device data, such as an address, a customer identifier, a device identifier, and the like.

Data storage 146 may store a unique ID received from the new device provider system 120 over network 110. Data storage 146 may store existing customer device data such as an address, a customer identifier, a device identifier, and the like. Data storage 146 may store a new device provider application. A new device provider application may create a link between the existing device 140 and the new device provider system 120. A new device provider application may allow a customer to log into an account associated with a new device provider system 120.

Data storage 136, 146 also may include various software components to facilitate the operation of new customer device 130 and existing customer device 140, respectively. For example, data storage 136, 146 may include an operating system such as, for example, the iOS operating system from Apple, the Google Android operating system, and the Windows Mobile operating system from Microsoft. Data storage 136, 146 may also include, without limitation, software applications such as mobile banking applications and financial institution application, an NFC application programming interface, and software to enable touch sensitive displays. Data storage 136, 146 may include software stacks or Application Programming Interfaces (APIs) which allow software applications to be written on top of the software stacks. For example, APIs my include, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Antennae 138, 148 may include an NFC, Bluetooth, BLE, and/or other antenna so that a new customer device 130 and an existing customer device 140 may communicate wirelessly with one another.

By way of example, a new customer device 130 may be an electronic transaction card. An electronic transaction card may include any transaction card that is able to display alerts, notifications, and/or other output to a card holder via a display and/or LED lighting 126 and/or receive input to interact with the electronic transaction card via, for example, a sensor. Electronic transaction card also may be composed of various materials that enable the entire exterior surface of card to act as a sensor. An electronic transaction card may be able to communicate with, for example, a mobile device using RFID, Bluetooth, NFC, WiFi Direct, and/or other related technologies. For example, communications between an electronic transaction card and a mobile device may include methods, systems, and devices as described in Applicant's U.S. patent application Ser. No. 14/338,423 filed on Jul. 23, 2014, published as U.S. Patent Publication No. 2015/0032635, the entire contents of which is incorporated herein by reference. An electronic transaction card may be able to communicate with EMV terminals via contact points positioned on the exterior of card connected to an EMV processor located on or in the electronic transaction card. For example, contact points positioned on the exterior of the electronic card may be directly connected and adjacent to the EMV processor. In another example, the contact points positioned on the exterior of the electronic transaction card may be connected to EMV processor using a form of wired connection (e.g., electrical wiring, plastic jumpers, and/or the like) such that the EMV processor may be positioned at any location in the interior of the card 120 as described in Applicant's U.S. patent application Ser. No. 15/098,830, published as U.S. Patent Publication No. 2016/0307081, the entire contents of which is incorporated herein by reference.

Figure 2:
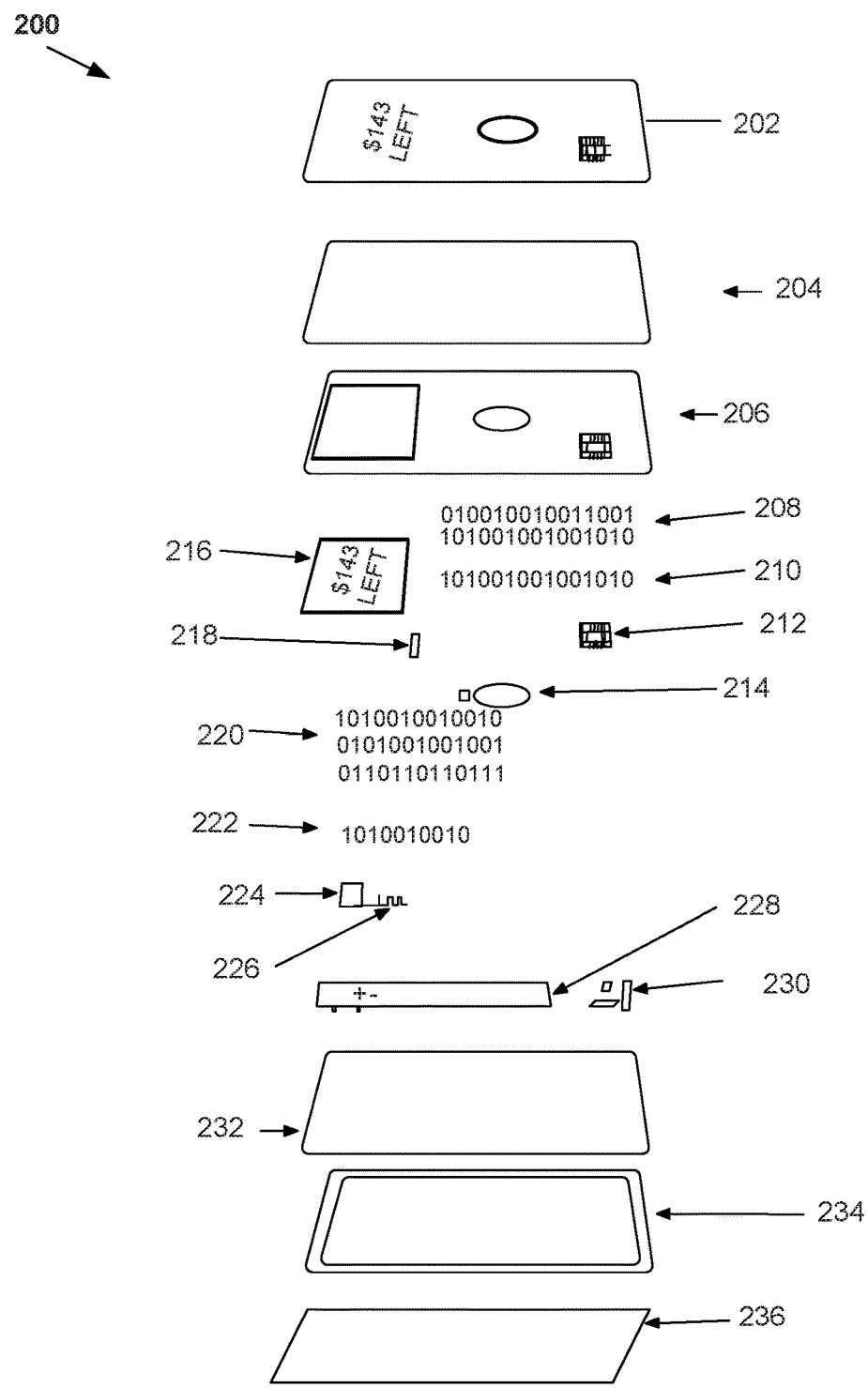
FIG. 2 depicts an example embodiment of an electronic card as a new customer device according to embodiments of the disclosure.
Figure 3:
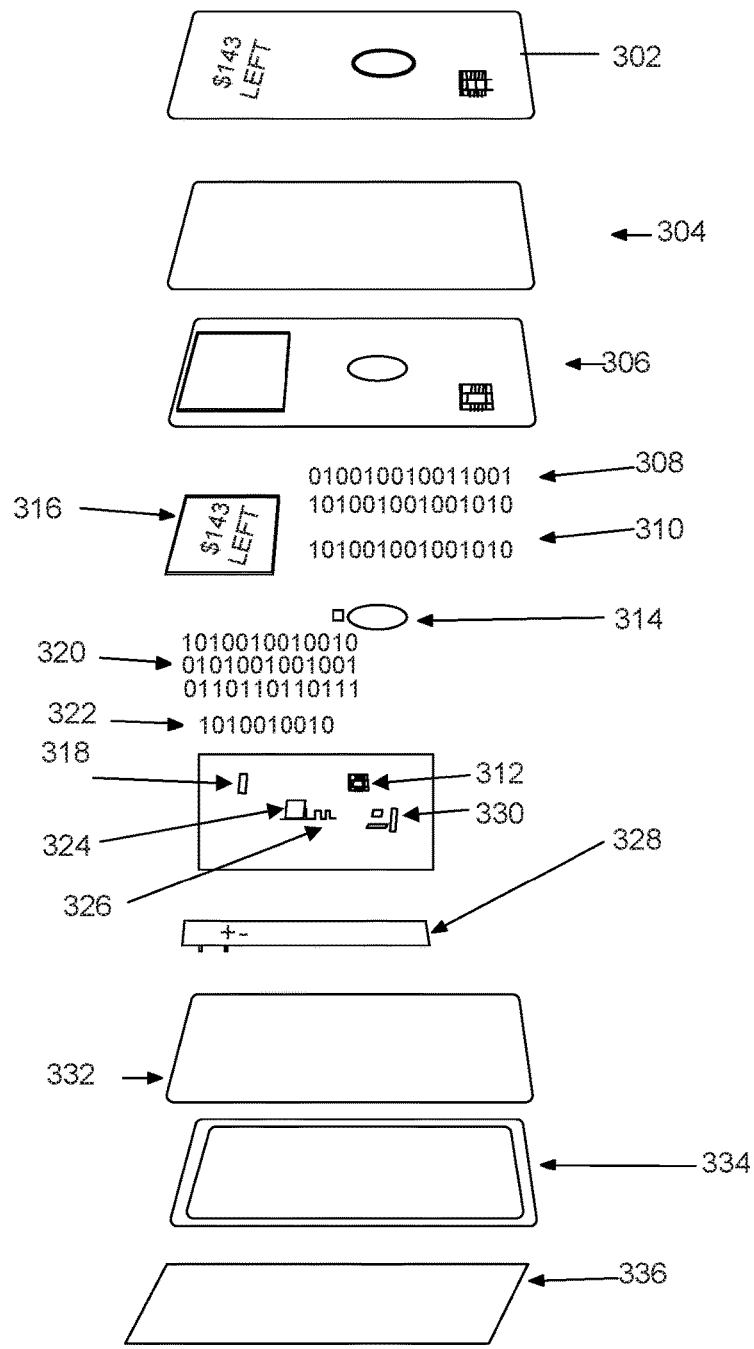
FIG. 3 depicts an example embodiment of an electronic card as a new customer device according to embodiments of the disclosure.

An electronic transaction card may also include hardware components to provide contactless payments and/or communications. For example, an electronic transaction card may include an output layer, an outer protective layer, potting, application (e.g., a Java Applet), application integration (e.g., Java Applet integration), an EMV processor, one or more sensors, a display, a display driver, firmware, a bootloader, a microcontroller, one or more antenna, a battery, power management, a flexible PCB, a chassis, and/or card backing as illustrated in FIGS. 2 and 3. An EMV processor embedded in the electronic transaction card may include a number of contacts that may be connected and activated using an interface device.

FIG. 2 depicts an example electronic transaction card 200. As shown in FIG. 2, electronic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), polyester film or plastic sheet (e.g., Mylar), polycarbonate (PC), and/or the like. An electronic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, thin film alloys, ITO, ZnO, a sapphire glass material, PVC, PET, BoPET (e.g., Mylar), polyvinylidene fluoride (e.g., Kynar), polyvinylidene difluoride, PC and/or PET-G.

An electronic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the internal components of card 200. For example, injection molding may include ABS, thermoplastic elastomers (TPE), thermoplastic vulcanizate (TPV), thermoplastic polyurethane (TPU), PET, polycarbonates (PC), cold lamination of the outer films to the body of the card using thermoactive adhesives, hot lamination of the outer films to the body of the card using thermoactive adhesives, and/or silicone. An electronic transaction card 200 may further include a Java Applet 208 and Java Applet integration 210. Although a Java Applet 208 is used through the specification, any other type of code application may be used. Moreover, although Java Applet integration 210 is used throughout this specification, any type of interface may be used to allow the microcontroller to interact with the EMV processor. A Java Applet 208 may include code that executes payments, such as payment made using an EMV processor. A Java Applet 208 may include account-provider specific code to execute display functionality specific to the account provider. Java Applet integration 210 may include coded interfaces to allow the microcontroller to interact with the EMV processor 212.

An EMV processor 212 may include and/or be connected to a number of contacts that may interact with a terminal configured to read data stored on an EMV processor 212. During an EMV transaction, application cryptograms may be used to send and receive data packets between the electronic transaction card 200 and a terminal, such as a merchant terminal, which may be similar to a terminal included at a merchant 150. For example, data packets may include user authentication information which an acquisition system and/or issuing financial institution may use to authenticate a transaction card 200 during a transaction. Various cryptographic protocols and/or methods may be used in this data transmission and reception process. Moreover, during a transaction issuing financial institutions and/or acquisition systems may return script commands to the EMV processor 212 via a terminal. These script commands and/or data packets may be transmitted between parties over a network. Script commands may be used, for example, to block transactions, change transaction data stored on the EMV processor (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Electronic transaction card 200 may also include one or more sensors 214 to receive input. Sensors 214 may include an activation sensor and/or an operation sensor, which may be combined and/or separate. An activation sensor may activate the electronic transaction card 200 and an operation sensor may instruct the electronic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the electronic transaction card and/or a password received on a paired mobile device), and/or the like. An operation sensor may change a display 216 based on received input, conduct a transaction via, for example an EMV processor 212 and/or contactless payment technologies based on received input, attempt a pairing of a card 200 and a mobile device, and/or the like.

By way of example, a sensor 214 may include a capacitive touch sensor, a piezoelectric sensor, an inductive sensor, load cells, a light sensor, a temperature sensor, a resistive touchscreen, including for example an analogue matrix real (AMR) sensors, and/or the like. Sensors 214 may include accelerometers and/or photo sensors to detect motion input.

Although the sensor 214 is depicted at a particular spot in the transaction card 200, a sensor 214 may be placed at any portion of the card to detect, for example, touch, light, heat, energy, and/or the like. For example, a sensor may be placed around the outer edges of an electronic transaction card 200 or at any spot within the electronic transaction card 200. Sensor 214 also may include the entire exterior surface of transaction card 200.

A display 216 may be provided within the transaction card 200. Although the display as shown includes, for example, a dot matrix display, a number of other display options may be included in the transaction card 200. For example, lighting, such as LED lighting, OLED lighting, electro luminescent (EL) displays and/or the like, may be used as display components. Display components may also include electronic paper, Mirasol™, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered, for example, depending on which account or card is selected to be used. For example, where electronic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered when, for example, an electronic card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to electronic card 200 via a wireless connection. A display may also be altered when electronic card 200 activates a new account. For example, when an account holder applies for a new account (e.g., a new credit card account, a new checking account, and/or the like), if approved, new account data may be transmitted to electronic card 200. New account data may be received at an account holder's mobile device from an issuing financial institution via a network (e.g., using a mobile application, mobile optimized website, and/or the like). New account data may then be transmitted from an account holder's mobile device to electronic card 200 via a wireless connection (e.g., BLE, RFID, NFC, WiFi, and/or the like) or a contact connection (e.g., using a terminal in contact with an EMV processor and/or other microchip).

As described herein, card 200 may be fully or partially pre-loaded with account and/or card data. For example, an applet and placeholder data (or actual data) may be stored within electronic card 200. Accordingly, when an account holder wishes to activate a new account (e.g., account holder who maintains a first credit account may wish to apply for a second credit account), the new account data and/or activation signal may be received from an account holder's mobile device via a wireless connection or a contact connection (e.g., using a terminal in contact with an EMV processor and/or other microchip) and a new account and/or card may be activated and able to be displayed on electronic card 200.

An electronic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A electronic transaction card 200 may include firmware 220 and/or a bootloader 222. A bootloader 222 may include code to be executed as an electronic card 200 is activated and before any operating system, firmware, or other code is executed on the electronic transaction card 200. A bootloader may be activated via a sensor 214 and energy storage component 228 of the electronic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Card 200 may also be activated using program code that may be flashed directly to a microprocessor such as microcontroller 224, EMV processor 212, and/or the like. Card 200 may not use a bootloader 222 but instead may cycle between a sleep state and an active state using program code and/or memory. An electronic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Microcontroller 224 may communicate with EMV processor 212, Java Applet 208, Java Applet integration 210, sensor(s) 214, power management 230, antenna 226, energy storage component 228, display 216, display driver 218, firmware 220, bootloader 222, and/or any other component of electronic transaction card 200. Microcontroller 224 may control the card operations to conduct transactions and/or display data as described throughout this specification.

Electronic transaction card 200 may include an energy storage component 228. Although energy storage component is depicted as a single component, energy storage component 228 may include a series of energy storage components. By way of example, energy storage component 228 may include a lithium polymer battery, a lithium-metal battery, lithium-ceramic battery, and/or any other type of battery. Energy storage component 228 may be constructed out of rigid materials, semi flexible materials, and/or flexible materials. Energy storage component 228 may provide power to card components contained within electronic transaction card 200. Energy storage component 228 may be a combine battery/potting component to support electronic transaction card 200.

Electronic transaction card 200 may include a power management component 230 that may manage the charging and discharging of energy storage component 228. Power management component 230 may convert voltage to a predetermined level in order to operate electronic transaction card 200 as discussed throughout the specification. Power management component 230 and/or energy storage component 228 may include, for example, solar power cells to convert solar energy into an electrical current within a solar panel. Power management component 230 and/or energy storage component 228 may include connections to sensors 214 to receive input and activate electronic transaction card 200 (e.g., motion input, thermal input, manual input, touch input, and/or the like).

A flexible printed circuit board (PCB) 232 may be included in electronic transaction card 200. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB 232 may include electronic components and connections that power electronic transaction card 200. Flexible PCB 232 may control and/or provide integration between the components of card 200. For example, flexible PCB 232 mechanically supports and electronically connects the electronic components of card 200 using, for example, conductive tracks, pads, and/or other features. PCB 232 may be combined with an energy component (e.g., battery component, power component, etc.) as described in Applicant's U.S. patent application Ser. No. 15/098,935 filed on Apr. 14, 2016, published as U.S. Patent Publication No. 2016/0308371, which is incorporated by reference. A flexible PCB may also provide antenna support. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silk-screened, and/or the like. FPC 232 may be used as a structural member for the electronic components of card 200 and/or for the card system as a whole 200.

Electronic transaction card 200 may include a chassis 234 as a frame or supporting structure. Chassis 234 may be a mount for a flexible PCB 232 and may be constructed out of flexible or semi-flexible material as well. Chassis 234 may be constructed out of a number of materials, including but not limited to, PVC, PC, ABS, styrene, polycarbonate, polyester, PET, any material that is easily molded, deposited, or laser cut (e.g., organic or inorganic material such as paper, plastic, and/or engineered ceramics), and/or the like. Chassis 234 may be constructed out of a conductive material. Chassis 234 may increase the rigidity of electronic transaction card 200 to prevent damage. Chassis 234 may also be used to detect if electronic transaction card 200 is being held by including sensors 214 around chassis 234. Where chassis 234 is constructed out of a conductive material, a dielectric constant of chassis 234 and/or card 200 may be monitored to detect handling of card 200. A chassis 234 may be used to detect handling of card 200 via a strain gauge. Chassis 234 may be included within or separate from a card backing 236. Card backing 236 may include a magnetic stripe that may be read using a magnetic stripe reader. A magnetic stripe may store tracks of data that are used to conduct a transaction using an electronic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, an electronic transaction card 200 that is paired to a mobile device via, for example, Bluetooth, BLE, RFID, and/or other wireless technologies, may receive new track data. The new track data may be unformatted, encrypted, encoded, and/or the like when the new track data is transmitted from the mobile device to the electronic transaction card 200. Upon receipt of the new track data, the new track data may be routed to a microprocessor, such as EMV processor 212 and/or microcontroller 224. EMV processor 212 and/or microcontroller 224 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time upon pairing an electronic transaction card 200 with a mobile device.

Card backing 236 may be made of similar material to that of the output layer 202 and/or the top protective layer 204. Card backing 236 may be made out of a plastic material.

Although the components of electronic transaction card 200 are illustrated in a particular fashion, these components may be combined and or placed throughout an electronic transaction card 200 in any manner, such as those depicted in FIG. 7.

For example, FIG. 3 illustrates an electronic transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV processor 312 which may be similar to EMV processor 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; energy storage component 328 which may be similar to energy storage component 228; power management 330 which may be similar to power management 230; a flexible PCB 332 which may be similar to flexible PCB 232; chassis 334 which may be similar to chassis 234; and/or card backing 336 which may be similar to card backing 236.

In the context of an electronic transaction card, software applications stored in data storage may include, for example mobile banking applications and applications associated with an electronic transaction card. Applications may include card on/off features that allow a cardholder associated with a mobile device, similar to existing customer device 140, to enable and disable a transaction card. For example, a card holder may use, for example, a mobile banking application stored on an existing customer device 140 to disable and/or enable accounts associated with an electronic transaction card. A mobile banking application may include, for example, an application as displayed on mobile device 420 in FIG. 4. In this example, an electronic transaction card may have account data pre-stored on the electronic transaction card to associate a number of different accounts with the electronic transaction card (e.g., debit card, credit card, prepaid card, and/or the like). If a card holder has a credit account established and desires to establish a debit card associated with the electronic transaction card, the card holder may use a mobile device and/or electronic transaction card to activate the inactive debit account on the electronic transaction card.

Figure 4:
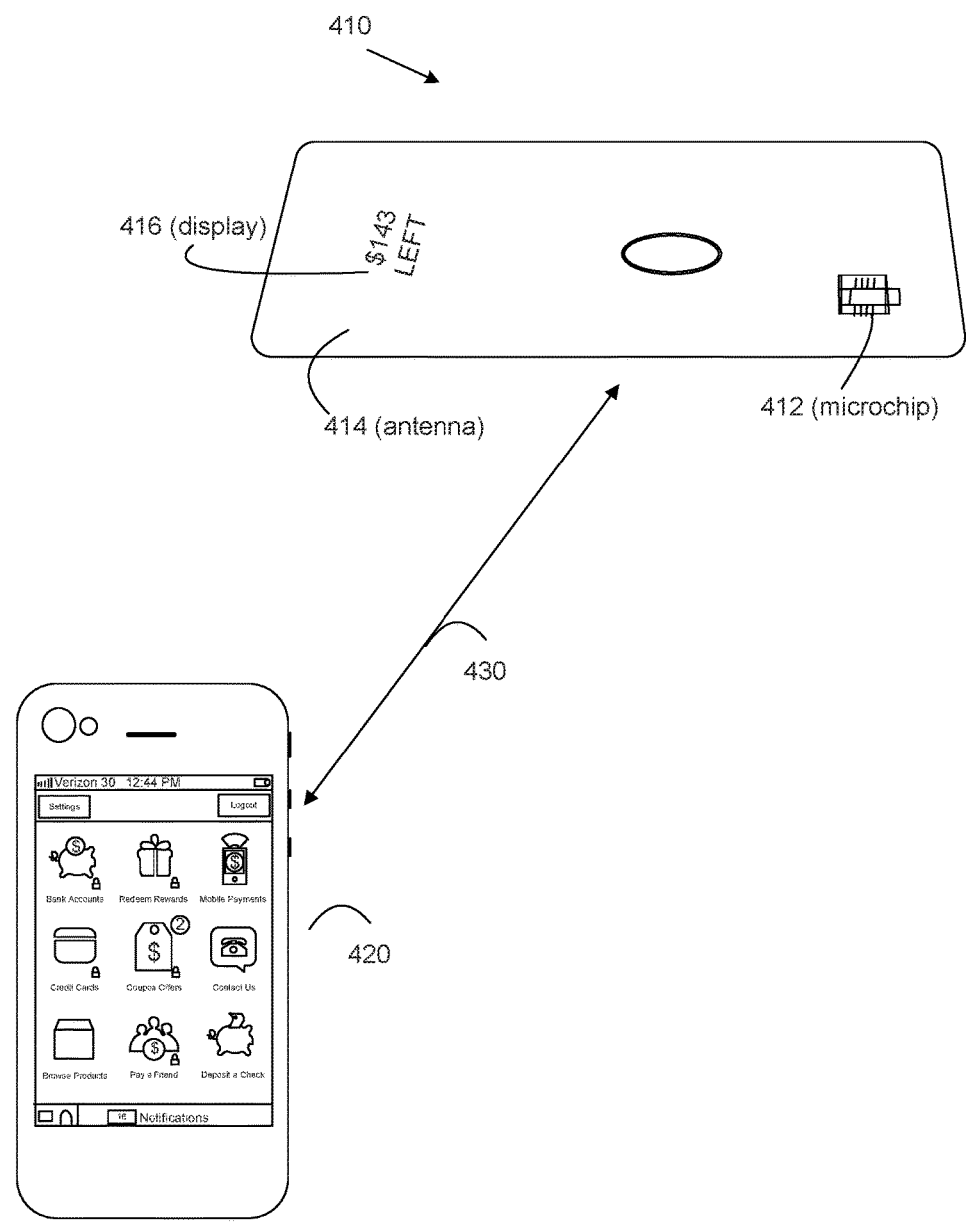
FIG. 4 depicts an example embodiment of an electronic card as a new customer device and a mobile device as an existing customer device according to embodiments of the disclosure.

FIG. 4 illustrates a system associated with the connection between an existing customer device, a mobile device, and a new customer device, an electronic transaction card. The example system 400 in FIG. 4 may enable a mobile device 420 storing a mobile banking application, for example, to receive a unique ID from the backend system associated with the mobile banking application. As described herein, the unique ID may be used to automatically generate a Bluetooth connection 430 between the electronic transaction card 410 and mobile device 420. As described herein, for example, data may be transmitted and received by electronic transaction card 410 via antenna 414. Data may be received and/or transmitted using, for example a mobile banking application that maintains and/or creates a secure connection with a financial institution to send and/or receive data related to an account associated with the financial institution. For example, a mobile banking application may include send and/or receive data related to a credit account, a debit account, a prepaid account, a loyalty account, a rewards account, and/or the like. Data received at electronic transaction card 410 may be stored on microchip 412 and/or may be displayed via display 416.

Figure 5:
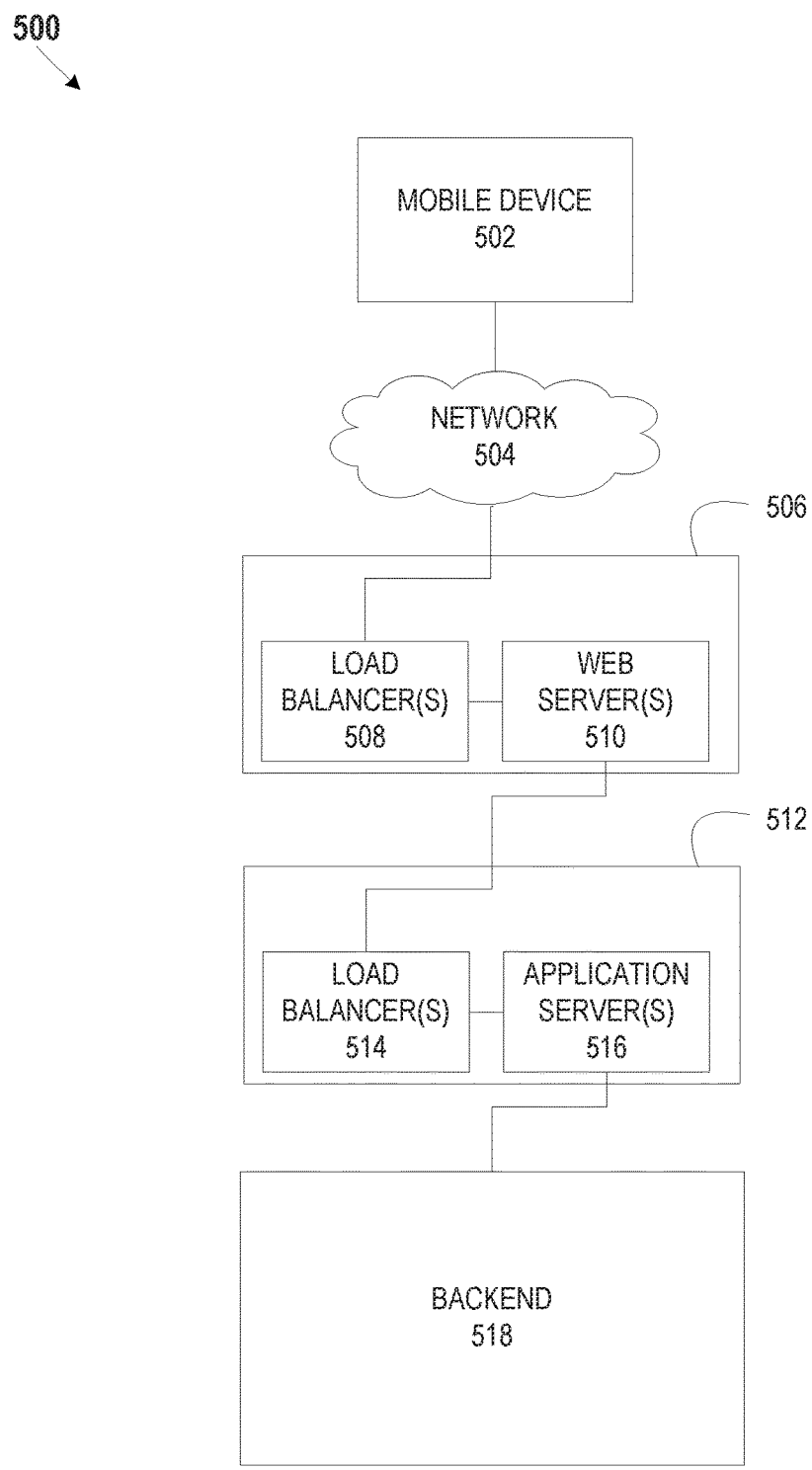
FIG. 5 depicts an example embodiment of a backend system connection to a client device, such as the connection between a device provider system and a customer device according to embodiments of the disclosure.

FIG. 5 illustrates a system associated with the automatic pairing of an existing customer device and a new customer device. The example system 500 in FIG. 5 may enable a new customer device provider system, for example, to provide services to its customers, and may include providing unique IDs, transaction card data, account data, and/or any other data to a mobile device that may in turn aid in the automated connection of the existing customer device to the new customer device.

As shown in FIG. 5, system 500 may include an existing customer device, such as mobile device 502, a network 504, a front-end controlled domain 506, a back-end controlled domain 512, and a backend 518. Front-end controlled domain 506 may include one or more load balancers 508 and one or more web servers 510. Back-end controlled domain 512 may include one or more load balancers 514 and one or more application servers 516.

Mobile device 502 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 500 may execute one or more software applications to enable, for example, network communications.

Mobile device 502 may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Mobile device 502 also may be similar to existing customer device 140 as shown and described in FIG. 1.

Network 504 may be one or more of a wireless network, a wired network, or any combination of a wireless network and a wired network. For example, network 504 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 504 may include, without limitation, telephone lines, fiber optics, IEEE Ethernet 902.3, a wide area network (WAN), a local area network (LAN) or a global network such as the Internet. Also, network 504 may support an Internet network, a wireless communication network, a cellular network, or the like, or any combination thereof. Network 504 may further include one network, or any number of example types of networks mentioned above, operating as a stand-alone network or in cooperation with each other. Network 504 may utilize one or more protocols of one or more network elements to which they are communicatively couples. Network 504 may translate to or from other protocols to one or more protocols of network devices. Although network 504 is depicted as a single network, it should be appreciated that according to one or more embodiments, network 504 may comprise a plurality of interconnected networks, such as, for example, the Internet, a service provider's network, a cable television network, corporate networks, and home networks.

Front-end controlled domain 506 may be implemented to provide security for backend 518. Load balancer(s) 508 may distribute workloads across multiple computing resources, such as, for example computers, a computer cluster, network links, central processing units or disk drives. In various embodiments, load balancer(s) 510 may distribute workloads across, for example, web server(s) 516 and/or backend 518 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 508 may include software that monitoring the port where external clients, such as, for example, mobile device 502, connect to access various services of a financial institution, for example. Load balancer(s) 508 may forward requests to one of the application servers 516 and/or backend 518 servers, which may then reply to load balancer 508. This may allow load balancer(s) 508 to reply to mobile device 502 without mobile device 502 ever knowing about the internal separation of functions. It also may prevent mobile devices from contacting backend servers directly, which may have security benefits by hiding the structure of the internal network and preventing attacks on backend 518 or unrelated services running on other ports, for example.

A variety of scheduling algorithms may be used by load balancer(s) 508 to determine which backend server to send a request to. Simple algorithms may include, for example, random choice or round robin. Load balancers 508 also may account for additional factors, such as a server's reported load, recent response times, up/down status (determined by a monitoring poll of some kind), number of active connections, geographic location, capabilities, or how much traffic it has recently been assigned.

Load balancers 508 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 510 may include hardware (e.g., one or more computers) and/or software (e.g., one or more applications) that deliver web content that can be accessed by, for example a client device (e.g., mobile device 502) through a network (e.g., network 504), such as the Internet. In various examples, web servers, may deliver web pages, relating to, for example, online banking applications and the like, to clients (e.g., mobile device 502). Web server(s) 510 may use, for example, a hypertext transfer protocol (HTTP/HTTPS or sHTTP) to communicate with mobile device 502. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 510 may respond with the content of that resource or an error message if unable to do so. The resource may be, for example a file on stored on backend 518. Web server(s) 510 also may enable or facilitate receiving content from mobile device 502 so mobile device 502 may be able to, for example, submit web forms, including uploading of files.

Web server(s) also may support server-side scripting using, for example, Active Server Pages (ASP), PHP, or other scripting languages. Accordingly, the behavior of web server(s) 510 can be scripted in separate files, while the actual server software remains unchanged.

Load balancers 514 may be similar to load balancers 508 as described above.

Application server(s) 516 may include hardware and/or software that is dedicated to the efficient execution of procedures (e.g., programs, routines, scripts) for supporting its applied applications. Application server(s) 516 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s)

516 may act as a set of components accessible to, for example, a financial institution, or other entity implementing system 500, through an API defined by the platform itself. For Web applications, these components may be performed in, for example, the same running environment as web server(s) 510, and application servers 516 may support the construction of dynamic pages. Application server(s) 516 also may implement services, such as, for example, clustering, fail-over, and load-balancing. In various embodiments, where application server(s) 516 are Java application servers, the web server(s) 516 may behaves like an extended virtual machine for running applications, transparently handling connections to databases associated with backend 518 on one side, and, connections to the Web client (e.g., mobile device 502) on the other.

Backend 518 may include hardware and/or software that enables the backend services of, for example, a financial institution, merchant, or other entity that maintains a distributed system similar to system 500. For example, backend 518 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 518 may include a system associated with a device provider, such as an electronics device provider.

Backend 518 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), and the like. Backend 518 also may be associated with one or more servers that enable the various services provided by system 500. Backend 518 may enable a device provider to implement various functions associated with the automated pairing of an existing customer device with a new customer device as shown and described herein.

For example, FIGS. 6 and 7 illustrate methods associated with the automated pairing of an existing customer device with a new customer device. Method 600 may begin at block 602. At block 604 a unique ID may be generated by a device provider system. A unique ID may be generated using existing data, such as a mobile device number, a customer name, a customer address, a customer account number, a device identifier, and the like. A unique ID may be generated using a random number generator. A unique ID may be a hashed version of any single piece or combination of existing data. Device provider system may store the unique ID within the device provider system.

At block 606, device provider system also may provide the unique ID to a new customer device prior to providing the new customer device to a customer. A unique ID may be stored within secure storage, such as a secure element, of the new customer device. The new customer device may then be associated with a specific customer, for example, by linking new device data (e.g., new device identifier, new device number, and the like) with customer data (e.g., customer name, address, account number, and the like). The new customer device may then be provided to the customer.

At block 608, a customer may log into an account via a webpage or mobile app on the existing customer device. The new device provider system may receive the log-in data associated with this log-in from the existing customer device. Upon receiving the log-in data the device provider system may perform a search to identify any new customer devices associated with the log-in data. For example, the log-in data may indicate a specific customer or customer account. The device provider system may look up the customer or customer account and search for any new devices associated with the account. If the device provider system finds a new device associated with the account, the device provider system will retrieve the unique ID associated with the new device and prepare it for transmission. In preparation for transmission, the device provider system may encrypt or hash the unique ID.

At block 610, the device provider system may transmit the unique ID and other data associated with the new device to the existing customer device associated with the log-in request. Other data associated with the new device may include a device ID or account ID, device type, model number, and the like. The existing customer device may receive the unique ID and other data associated with the new device and in response, in block 612, generate an advertising packet. The advertising packet may be designed to search for or solicit a response from a specific device associated with the unique ID. The advertising packet may include data associated with the new device. The advertising packet may be transmitted along advertising channels. The advertising packet may be transmitted via Bluetooth.

At block 614, the existing customer device may receive a response to the advertising packet. For example, the advertising packet may have located the new device within proximity to the existing device. The new device may have received the advertising packet via Bluetooth technologies. The new device may have generated a response to the received advertising packet. The response generated by the new device may include the unique ID stored on the new device and/or some form of encrypted unique ID stored on the new device. The new device may then transmit the response that is received by the existing device over Bluetooth channels.

At block 616, the existing device may authenticate the new device using the unique ID that was received in response to the advertising packet and the unique ID received from the device provider system that may be stored within the existing device. The authentication may include decrypting or decoding the unique IDs to compare the unique IDs. If the comparison indicates that the unique IDs are identical, a secure Bluetooth connection may be made between the new customer device and the existing customer device. In block 618, a secure Bluetooth connection may be made by generating a link key or a shared secret key using the unique ID. For example, the unique ID or a portion thereof may be used to generate a new link key that may be stored within the existing device and new device to ensure pairing between the devices when they are within range of one another.

The method may end at block 620.

Method 700 may begin at block 702. At block 704 a unique ID may be generated by a device provider system. A unique ID may be generated using existing data, such as a mobile device number, a customer name, a customer address, a customer account number, a device identifier, and the like. A unique ID may be generated using a random number generator. A unique ID may be a hashed version of any single piece or combination of existing data. Device provider system may store the unique ID within the device provider system.

At block 706, device provider system also may provide the unique ID to a new customer device prior to providing the new customer device to a customer. A unique ID may be stored within secure storage, such as a secure element, of the new customer device. The new customer device may then be associated with a specific customer, for example, by linking new device data (e.g., new device identifier, new device number, and the like) with customer data (e.g., customer name, address, account number, and the like). The new customer device may then be provided to the customer.

At block 708, a customer may log into an account via a webpage or mobile app on the existing customer device. The new device provider system may receive the log-in data associated with this log-in from the existing customer device. Upon receiving the log-in data the device provider system may perform a search to identify any new customer devices associated with the log-in data. For example, the log-in data may indicate a specific customer or customer account. The device provider system may look up the customer or customer account and search for any new devices associated with the account. If the device provider system finds a new device associated with the account, the device provider system will retrieve the unique ID associated with the new device and prepare it for transmission. In preparation for transmission, the device provider system may encrypt or hash the unique ID.

At block 710, the device provider system may transmit the unique ID and other data associated with the new device to the existing customer device associated with the log-in request. Other data associated with the new device may include a device ID or account ID, device type, model number, and the like. The existing customer device may receive the unique ID and other data associated with the new device and in response, in block 712, generate an advertising packet. The advertising packet may be designed to search for a specific device associated with the unique ID. The advertising packet may include the received unique ID or an encrypted version of the received unique ID. The advertising packet may include data associated with the new device. The advertising packet may be transmitted along advertising channels. The advertising packet may be transmitted via Bluetooth.

At block 714, the new device may authenticate the existing device using the unique ID that was received in the advertising packet and the unique ID stored within the new device. For example, the advertising packet may have located the new device within proximity to the existing device. The new device may have received the advertising packet via Bluetooth technologies. The new device may perform an authentication based on the information in the received advertising packet. The authentication may include decrypting or decoding the unique IDs to compare the unique IDs. If the comparison indicates that the unique IDs are identical, a secure Bluetooth connection may be made between the new customer device and the existing customer device.

At block 716, the new device may generate a response to the advertising packet based on the authentication performed on the new device. The response may include an indication that the connection between the new device and existing device has been authenticated. The response may include a link key or portion thereof generated by the new device in response to a proper authentication. A link key may be used to send and receive data in a secure manner over a Bluetooth connection. The new device may then transmit the response over Bluetooth channels. The existing device may receive the response to the advertising packet via Bluetooth technologies.

In block 718, a secure Bluetooth connection may be made using the link key. The method may end at block 720.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A Bluetooth-pairing device comprising: data storage storing a software application;
   a Bluetooth antenna;
   an input/output interface; and
   a microprocessor configured to:
      receive, via the input/output interface, interaction data associated with the software application;
      transmit, via the input/output interface, a request for a first unique identifier (ID) to a device provider system in response to the received interaction data associated with the software application;
      receive, in response to the transmitted request, the first unique ID;
      transmit, via the Bluetooth antenna, an advertising packet to a new device;
      receive, via the Bluetooth antenna, a response to the advertising packet comprising a second unique ID from the new device;
      compare the second unique ID with the first unique ID;
      generate, if the first unique ID and the second unique ID match, a link key, wherein the link key is based on at least a portion of the first or second unique ID;
      transmit, via the Bluetooth antenna, at least a portion of the link key to the new device; and
      pair the Bluetooth-pairing device with the new device using at least a portion of the link key.

2. The Bluetooth-pairing device of claim 1, wherein the first and/or second unique ID is generated using existing data comprising a mobile device number, a customer name, a customer address, a customer account number, and/or a device identifier.

3. The Bluetooth-pairing device of claim 1, wherein the first and/or second unique ID is generated using a random number generator.

4. The Bluetooth-pairing device of claim 1, wherein the first and/or second unique ID is stored on a backend system hosted by the device provider.

5. The Bluetooth-pairing device of claim 1, wherein the Bluetooth-pairing device controls wireless communications based on the device provider generated unique ID.

6. The Bluetooth-pairing device of claim 1, wherein the link key generates an encrypted Asynchronous Connection-Less (ACL) link that provides a secure connection between the Bluetooth-pairing device and the new device.

7. The Bluetooth-pairing device of claim 1, wherein the new device comprises an electronic transaction card.

8. The Bluetooth-pairing device of claim 1, wherein the advertising packet comprises data associated with the new device.

* * * * *